United States Patent [19]
Dore

[11] 4,159,983
[45] Jul. 3, 1979

[54] PURE AND SUBSTANTIALLY PURE ASYMMETRIC 1:2 COBALT COMPLEXES OF MONOAZO COMPOUNDS

[75] Inventor: Jacky Dore, Basel, Switzerland

[73] Assignee: Sandoz Ltd., Basel, Switzerland

[21] Appl. No.: 869,480

[22] Filed: Jan. 16, 1978

Related U.S. Application Data

[63] Continuation-in-part of Ser. No. 707,140, Jul. 20, 1976, abandoned.

[30] Foreign Application Priority Data

Jun. 14, 1977 [CH] Switzerland ............... 7292/77
Dec. 12, 1977 [CH] Switzerland ............... 15216/77
Jul. 25, 1975 [CH] Switzerland ............... 9738/78

[51] Int. Cl.$^2$ .................. C09B 45/20; C09B 45/48
[52] U.S. Cl. .................... 260/145 A; 260/145 B; 260/147; 260/150; 260/151
[58] Field of Search .............. 260/145 R, 14 A, 145 B

[56] References Cited

U.S. PATENT DOCUMENTS

| | | | |
|---|---|---|---|
| 2,806,760 | 9/1957 | Brassel et al. ........... | 260/145 A |
| 2,906,746 | 9/1959 | Brassel et al. ........... | 260/145 A |
| 3,005,813 | 10/1961 | Bassel et al. ........... | 260/145 A |
| 3,356,671 | 12/1967 | Johnson et al. ........... | 260/145 R |
| 3,516,980 | 6/1970 | Dore et al. ........... | 260/145 A |
| 3,525,732 | 8/1970 | Beefa et al. ........... | 260/145 A |
| 3,632,568 | 1/1972 | Neier ........... | 260/145 A |
| 3,879,336 | 4/1975 | Maeda et al. ........... | 260/145 A |
| 3,970,615 | 7/1976 | Schutz et al. ........... | 260/145 B |
| 3,994,872 | 11/1976 | Kuster ........... | 260/145 A |
| 4,005,067 | 1/1977 | Dore ........... | 260/147 |

FOREIGN PATENT DOCUMENTS

| | | | |
|---|---|---|---|
| 1481310 | 5/1967 | France ............... | 260/145 A |
| 1371926 | 10/1974 | United Kingdom ............... | 260/147 |

*Primary Examiner*—Charles F. Warren
*Attorney, Agent, or Firm*—Gerald D. Sharkin; Richard E. Vila; Melvyn M. Kassenoff

[57] ABSTRACT

Pure and substantially pure asymmetric 1:2 cobalt complexes of the formula,

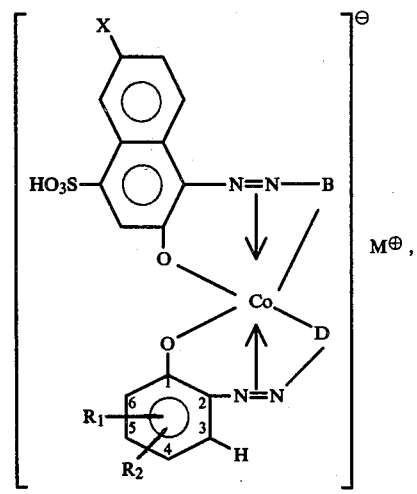

and mixtures of such complexes, in which X is hydrogen or nitro, either, $R_1$ and $R_2$, independently, are hydrogen, $(C_{1-4})$-alkyl, $(C_{1-4})$alkoxy, chlorine, bromine or nitro or $R_1$ is hydrogen, chlorine or nitro, and $R_2$ is $-SO_2NR_3R_4$, in which $R_1$ and $R_2$ occupy the 4- and 5-positions, either $R_3$ is hydrogen or unsubstituted or substituted $(C_{1-4})$alkyl, and $R_4$ is hydrogen or unsubstituted or substituted $(C_{1-4})$alkyl, $(C_{5-7})$cycloalkyl or phenyl, or $R_3$ and $R_4$ or together with the nitrogen atom to which they are bound, form a non-aromatic 5- or 6-membered heterocyclic ring which contains one or two hetero atoms, B is a divalent radical of a coupling component of the 1- or 2-hydroxynaphthalene series which is coupled in the 2- or 1- position ortho to the hydroxy group and is bound to the cobalt atom through the oxygen atom, D is a divalent radical of a coupling component of the 2-naphthylamine series which is coupled in the 1-position ortho to the amino group or a divalent radical of the 5-aminopyrazole series which is coupled to the carbon atom next to that carrying the amino group, whereby the divalent radical D is bound to the cobalt atom through the amino group, and M⊕ is hydrogen or an equivalent of a non-chromophoric cation, with the provisos that the molecule (i) contains a single sulpho group, which sulpho group is in salt form, (ii) contains at maximum a single sulphonamide group, which group is in radical D or is $R_2$, and (iii) is free from

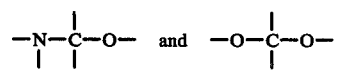

groups, which complexes and mixtures are useful for dyeing or printing nitrogen-containing organic substrates, for example natural and synthetic polyamides such as wool, silk and nylon, polyurethanes and leather.

29 Claims, No Drawings

PURE AND SUBSTANTIALLY PURE ASYMMETRIC 1:2 COBALT COMPLEXES OF MONOAZO COMPOUNDS

This application is a continuation-in-part of application Ser. No. 707,140, filed July 20, 1976 and now abandoned.

The present invention relates to pure and substantially pure 1:2 cobalt complexes and mixtures of such pure asymmetric complexes, their production and use.

More particularly, the present invention provides pure and substantially pure asymmetric 1:2 cobalt complexes of formula I,

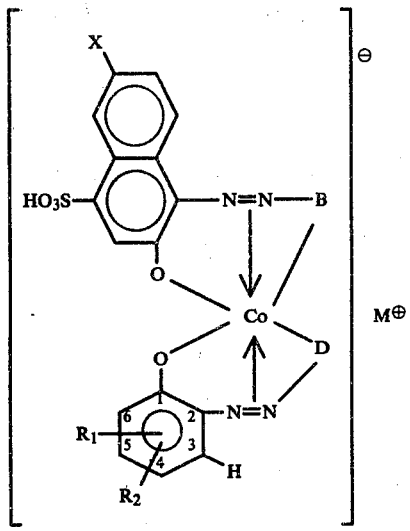

in which X is hydrogen or nitro, either, $R_1$ and $R_2$, independently, are hydrogen, $(C_{1-4})$-alkyl, $(C_{1-4})$alkoxy, chlorine, bromine or nitro, or $R_1$ is hydrogen, chlorine or nitro, and $R_2$ is $-SO_2NR_3R_4$, in which case $R_1$ and $R_2$ occupy the 4- and 5-positions, either $R_3$ is hydrogen or unsubstituted or substituted $(C_{1-4})$ alkyl, and $R_4$ is hydrogen or unsubstituted or substituted $(C_{1-4})$alkyl, $(C_{5-7})$cycloalkyl or phenyl, or $R_3$ and $R_4$, together with the nitrogen atom to which they are bound, form a non-aromatic 5- or 6-membered heterocyclic ring which contains one or two hetero atoms, B is a divalent radical of a coupling component of the 1- or 2-hydroxynaphthalene series which is coupled in the 2- or 1- position ortho to the hydroxy group and is bound to the cobalt atom through the oxygen atom, D is a divalent radical of a coupling component of the 2-naphthylamine series which is coupled in the 1-position ortho to the amino group or a divalent radical of the 5-aminopyrazole series which is coupled to the carbon atom next to that carrying the amino group, whereby the divalent radical D is bound to the cobalt atom through the amino group, and M⊕ is hydrogen or an equivalent of a non-chromopheric cation, with the provisos that the molecule (i) contains a single sulpho group, which sulpho group is in salt form, (ii) contains at maximum a single sulphonamide group which group is in the radical D or is $R_2$, and (iii) is free from

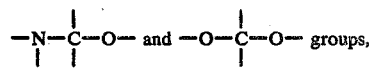

and mixtures of such pure asymmetric complexes.

When $R_1$ and/or $R_2$ is alkyl, such alkyl is preferably methyl or ethyl, with methyl being especially preferred.

When $R_1$ and/or $R_2$ is alkoxy, preferably such alkoxy is methoxy or ethoxy.

When $R_3$ and/or $R_4$ is an unsubstituted alkyl group, such alkyl group is straight-chain or branched and preferably contains 1 to 3 carbon atoms, with methyl, ethyl and isopropyl being especially preferred.

When $R_3$ and/or $R_4$ is a substituted alkyl group, such alkyl group is straight chain or branched and is substituted by one or more substituents common in the chemistry of anionic azo dyestuffs. Preferably such substituted alkyl groups are substituted by up to two substituents selected from halogen (preferably chlorine or bromine), hydroxy, cyano, $(C_{1-4})$alkoxy (preferably methoxy or ethoxy) and phenyl. Preferred substituents are hydroxy, methoxy and ethoxy. More preferably, any substituted alkyl group as $R_3$ and/or $R_4$ is monosubstituted.

When $R_4$ is substituted cycloalkyl or phenyl such cycloalkyl or phenyl radical is substituted by substituents common in the chemistry of anionic azo dyestuffs.

When $R_4$ is an unsubstituted or substituted cycloalkyl preferably such cycloalkyl contains 5 or 6 ring carbon atoms, with cyclohexyl being most preferred. Preferred substituted cycloalkyl groups are those which are substituted by up to three methyl groups.

When $R_4$ is substituted phenyl, preferably such phenyl is substituted by a total of up to three substituents selected from up to three halogen, $(C_{1-4})$alkyl, $(C_{1-4})$alkoxy and nitro (maximum of two nitro). More preferably, such substituted phenyl is monosubstituted by chlorine, nitro, methyl, methoxy or ethoxy or disubstituted by two methyl, two methoxy or two ethoxy groups. Most preferably any phenyl radical as $R_4$ is unsubstituted.

When $R_3$ and $R_4$, together with the nitrogen atom to which they are bound, form a heterocyclic ring, such heterocyclic ring is preferably an unsubstituted pyrrolidine, piperidine or morpholine ring.

By halogen is meant chlorine, bromine or fluorine, with chlorine and bromine being preferred.

$R_3$ is preferably $R_3'$, where $R_3'$ is hydrogen, $(C_{1-3})$alkyl or β- or γ-hydroxy $(C_{2-3})$alkyl. Most preferably, $R_3$ is hydrogen.

$R_4$ is preferably $R_4'$, where $R_4'$, is hydrogen; $(C_{1-3})$alkyl; β- or γ-hydroxy$(C_{2-3})$alkyl; $R_{11}O-(CH_2)_n-$, where $R_{11}$ is methyl or ethyl and n is 2, 3 or 4, preferably 2 or 3; phenyl; phenyl monosubstituted by chlorine, nitro, methyl, methoxy or ethoxy; or phenyl disubstituted by two methyl, two methoxy or two ethoxy groups. More preferably $R_4$ is $R_4''$, where $R_4''$ is methyl, ethyl, isopropyl, 2-hydroxyethyl, $-CH_2-CH(OH)-CH_3$, $-(CH_2)_3-OCH_3$ or phenyl. Even more preferably $R_4$ is $R_4'''$, where $R_4'''$ is methyl, $-(CH_2)_3-OCH_3$ or phenyl.

Preferably $R_1$ is $R_1'$, where $R_1'$ is hydrogen, methyl, chlorine or nitro. More preferably, $R_1$ is $R_1''$, where $R_1''$ is hydrogen, chlorine or nitro.

$R_2$ is preferably $R_2'$, where $R_2'$ is chlorine, nitro or —$SO_2NHR_4''$, preferably —$SO_2NHR_4'''$, with the proviso that when $R_2'$ is —$SO_2NHR_4''$ or —$SO_2NHR_4'''$, $R_1'$ is hydrogen.

More preferably, $R_1$ and $R_2$, independently, are chlorine or nitro. When one of $R_1$ and $R_2$ is hydrogen and the other has a significance other than hydrogen, the substituent is preferably in the 4- or 5- position. When both of $R_1$ and $R_2$ have a significance other than hydrogen, the substituents are preferably in the 4- and 6-positions, with the exception that when $R_2$ is —$SO_2NR_3R_4$ the substituents $R_1$ and $R_2$ are in the 4- and 5-positions.

The group B is preferably a group of formula (a), (b), (c) or (d),

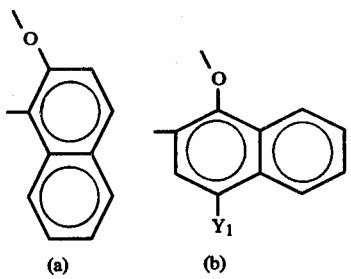

(a)  (b)

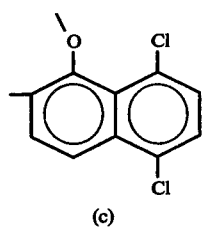

(c)  (d)

in which
$Y_1$ is hydrogen, $(C_{1-2})$alkyl (preferably methyl), $(C_{1-2})$alkoxy (preferably methoxy), chlorine or bromine;
preferably $Y_1$ is $Y_1'$, where $Y_1'$ is hydrogen, methyl or methoxy.

More preferably B is B', where B' is a group of formula (a), (c), (d) or (b) in which $Y_1$ is $Y_1'$.

The group D is preferably a group of formula (e) or (f),

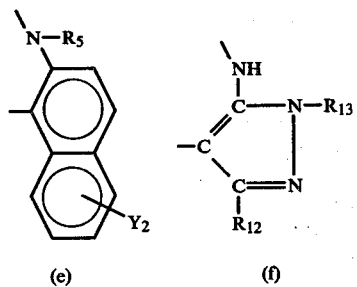

(e)  (f)

in which
$R_5$ is hydrogen, $(C_{1-4})$alkyl or a group of formula (g) or (h),

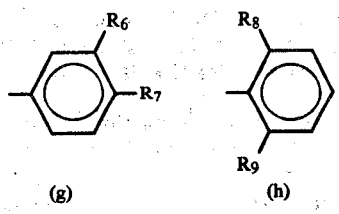

(g)  (h)

in which one of
$R_6$ and $R_7$ is hydrogen and the other is hydrogen, chlorine, bromine, $(C_{1-2})$alkyl (preferably methyl), $(C_{1-2})$alkoxy (preferably methoxy) or trifluoromethyl,
$R_8$ is hydrogen or methyl, and
$R_9$ is methyl, chlorine or bromine with the proviso that when $R_9$ is chlorine or bromine $R_8$ is hydrogen,
$Y_2$ is hydrogen or —$SO_2NHR_{10}$ in the 5-or 6- position, in which $R_{10}$ is hydrogen, $(C_{1-4})$alkyl or hydroxy$(C_{2-4})$alkyl,
$R_{12}$ is hydrogen; $(C_{1-4})$, preferably $(C_{1-2})$alkyl, more preferably methyl; $(C_{1-2})$, alkoxy, preferably methoxy; or phenyl,
$R_{13}$ is hydrogen; $(C_{1-4})$alkyl, preferably $(C_{1-2})$alkyl; phenyl$(C_{1-4})$alkyl, preferably phenyl $(C_{1-2})$alkyl;

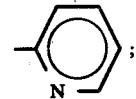

cyclohexyl or a radical of formula (i)

(i)

in which either
$Z_1$ is hydrogen and
$Z_2$ is hydrogen; fluorine; chlorine; bromine; $(C_{1-4})$alkyl, preferably $(C_{1-2})$alkyl; $(C_{1-2})$alkoxy; nitro or trifluoromethyl,
or $Z_1$ and $Z_2$ are the same and are both chlorine, bromine, methyl or methoxy, with the provisos that:
when both $Z_1$ and $Z_2$ are chlorine, the chlorine atoms are in the 2,3-, 2,4-, 2,5-, 2,6- or 3,4-positions,
when both $Z_1$ and $Z_2$ are bromine, the bromine atoms are in the 2,4- or 3,5-positions,
when both $Z_1$ and $Z_2$ are methyl, the methyl groups are in the 2,3-, 2,4-, 2,5-, 2,6- or 3,5-positions,
and when both $Z_1$ and $Z_2$ are methoxy, the methoxy groups are in the 3,4-positions, or $Z_1$ and $Z_2$ are different and signify 3-chloro-2-methyl, 4-chloro-2-methyl, 5-chloro-2-methyl, 4-bromo-2-methyl or 5-chloro-2-methoxy.

Preferably, $Z_1$ and $Z_2$ are $Z_1'$ and $Z_2'$, where $Z_1'$ and $Z_2'$ are, independently, hydrogen, chlorine or methyl, subject to above relevant provisos.

When $R_5$ is alkyl it is preferably methyl or ethyl.

When $R_5$ is a radical of formula (g), preferably one of $R_6$ and $R_7$ is hydrogen and the other is hydrogen, chlorine, methyl or methoxy, more preferably hydrogen, chlorine or methyl.

When $R_5$ is a radical of formula (h), $R_9$ is preferably $R_9'$, where $R_9'$ is methyl or chlorine.

Preferably $R_5$ is $R_5'$ where $R_5'$ is hydrogen, phenyl, 2,3- or 4-chlorophenyl, 2- or 4-methylphenyl or 2,6-dimethylphenyl. More preferably, $R_5$ is $R_5''$ where $R_5''$ is hydrogen or phenyl, with phenyl being especially preferred.

When $R_{10}$ is alkyl, such alkyl is preferably methyl or ethyl, more preferably methyl. When $R_{10}$ is hydroxyalkyl, such hydroxyalkyl is preferably $\beta$- or $\gamma$-hydroxy($C_{2-3}$)alkyl with $\beta$-hydroxyalkyl being preferred.

Preferably $R_{10}$ is $R_{10}'$, where $R_{10}'$ is hydrogen, methyl or $\beta$-hydroxy($C_{2-3}$)alkyl.

$Y_2$ is preferably hydrogen or $-SO_2NHR_{10}'$, hydrogen being preferred when $R_5$ is other than hydrogen and $-SO_2NHR_{10}'$ being preferred when $R_5$ is hydrogen. Most preferably $Y_2$ is hydrogen.

Preferably, in the radical of formula (e), $R_5$ is $R_5'$ and $Y_2$ is hydrogen or $-SO_2NHR_{10}'$. Most preferably (e) is a radical of formula (e)',

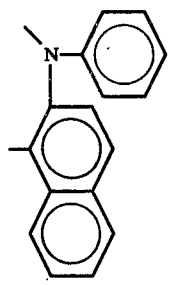

(e)'

In the radical of formula (f), $R_{12}$ is preferably methyl and $R_{13}$ is preferably a radical of formula (i).

Preferably (f) is a radical of formula (f)',

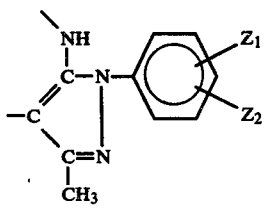

(f)' wherein $Z_1$ and $Z_2$ are as defined above.

Preferably, each of $Z_1$ and $Z_2$ are $Z_1'$ and $Z_2'$.

D is preferably a radical of formula (e), wherein $R_5$ is $R_5'$ and $Y_2$ is hydrogen or $-SO_2NHR_{10}'$ or a radical of formula (f)'. Most preferably D is a radical of formula (e)'.

Thus, the preferred asymmetric 1:2 cobalt complexes of formula I and mixtures of complexes are those wherein $R_3$ is $R_{3a}$ wherein $R_{3a}$ is hydrogen, $C_{1-4}$alkyl or $C_{1-4}$alkyl substituted by 1 or 2 substituents selected from halo, hydroxy, cyano, $C_{1-4}$alkoxy and phenyl, $R_4$ is $R_{4a}$ wherein $R_{4a}$ is hydrogen; $C_{1-4}$alkyl; $C_{1-4}$alkyl substituted by 1 or 2 substituents selected from halo, hydroxy, cyano, $C_{1-4}$alkoxy and phenyl; $C_{5-7}$cycloalkyl; $C_{5-7}$cycloalkyl substituted by 1 to 3 methyl groups; phenyl or phenyl substituted by 1 to 3 substituents selected from halo, $C_{1-4}$alkyl, $C_{1-4}$alkoxy and nitro (maximum of two nitros) or $R_{3a}$ and $R_{4a}$ taken together and with the nitrogen atom to which they are bound are pyrrolidino, piperidino or morpholino, B is a radical of formula (a), (b), (c) or (d), and D is a radical of formula (e) or (f).

Of these, those wherein $R_1$ is $R_1'$ and $R_2$ is $R_2'$ are preferred with those of this group wherein $R_5$ is $R_5'$ and $Y_2$ is hydrogen or $-SO_2NHR_{10}'$ being more preferred. Of these more preferred compounds, those wherein D is a radical of formula (e) wherein $R_5$ is $R_5'$ and $Y_2$ is hydrogen or $-SO_2NHR_{10}'$ or a radical of formula (f') are even more preferred.

Preferably, $M^\oplus$ is other than hydrogen and signifies an alkali metal cation, an unsubstituted ammonium ion, a lower alkyl-substituted ammonium ion, a hydroxy substituted lower alkylammonium ion, a higher alkyl substituted ammonium ion, a mono- or dicycloalkyl ammonium ion or a cycloimmonium ion. As examples of alkali metal cations may be given lithium, sodium and potassium. The unsubstituted, lower alkyl substituted and hydroxyalkylsubstituted ammonium may be represented by the formula $N^\oplus(R)_4$, where each R is, independently, hydrogen, ($C_{1-3}$) alkyl or hydroxy($C_{2-4}$)alkyl with the proviso that when one or more of the symbols R signifies hydroxyalkyl at least one R signifies hydrogen, for example, triethylammonium, mono-, di- and tri-ethanolammonium and mono-, di- and tri-isopropanolammonium and that in any hydroxyalkyl, the hydroxy group is other than on the $\alpha$-carbon atoms.

When $M^\oplus$ is a higher, e.g. $C_{5-12}$alkyl substituted-, mono- or bicyclo-, e.g. $C_{5-8}$alkyl substituted-ammonium ion or a cycloimmonium ion, the water solubility of the complexes is reduced such that they are scarcely water-soluble or only soluble in the presence of organic solvents. Examples of such ions include those derived from N-ethyl-N-hexylamine, cyclohexylamine, N,N-dicyclohexylamine and morpholine.

More preferably, $M^\oplus$ is an alkali metal cation with sodium being most preferred.

The 1:2 complexes in which $M^\oplus$ is hydrogen are, in general, scarcely soluble in water.

The salt form of the sulpho group may be formed with any non-chromophoric cation, preferred cations being the above-mentioned cations for $M^\oplus$. The salt form cation may be the same as or different from $M^\oplus$ and is preferably the same.

Representative asymmetric 1:2 cobalt complexes of formula I are those of formula Ia,

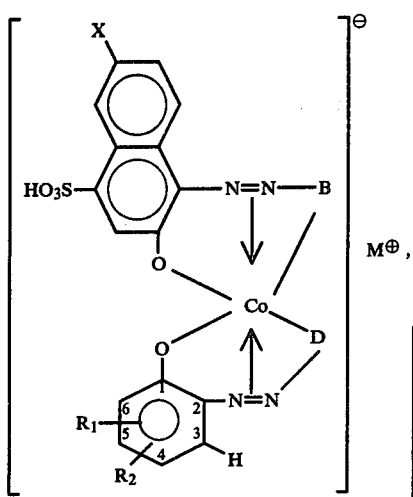

wherein
R₂ is hydrogen, $C_{1-4}$alkyl, $C_{1-4}$alkoxy, chloro, bromo, nitro or $-SO_2NR_{3a}R_{4a}$,
B is a radical of formula (a), (b), (c) or (d),
D is a radical of formula (e) or (f), and
$R_1$, X and $M^\oplus$ are as defined above, with the proviso that when D is a radical of formula (e), $R_5$ is hydrogen and B is a radical (a), then $Y_2$ is $-SO_2NHR_{10}$.

Of the complexes of formula Ia, those in which $R_5$ is $R_5'$ and $Y_2$ is hydrogen or $-SO_2NHR_{10}'$ are preferred.

Preferred complexes of formula I are those of formulae Ib and Ic

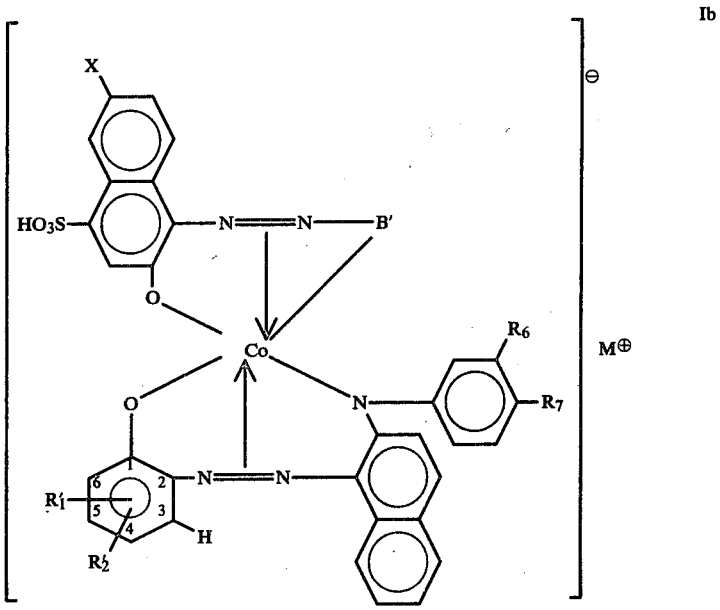

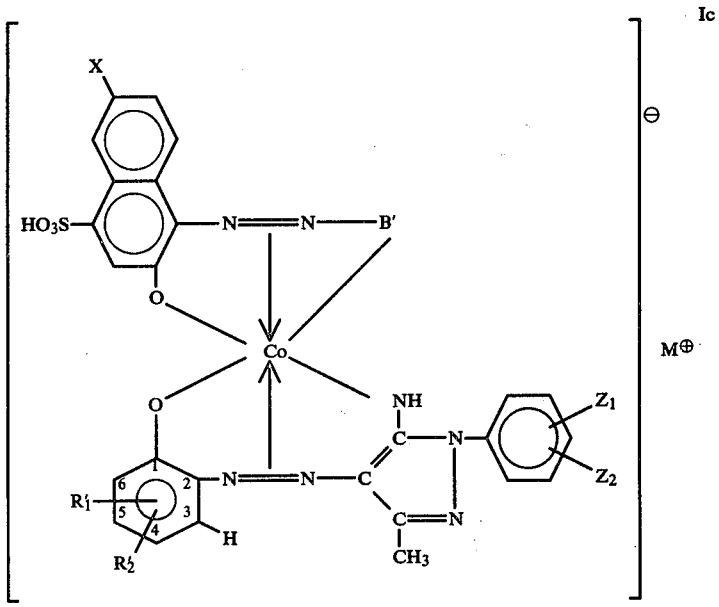

in which
$R_1'$ is hydrogen, methyl, chlorine or nitro, with hydrogen, chlorine and nitro being preferred,
$R_2'$ is chlorine, nitro or $-SO_2NHR_4''$ (preferably $-SO_2NHR_4'''$), with the proviso that $R_2'$ can be —SO$_2$NHR$_4$" or —SO$_2$NHR$_4$'" only when R$_1$' is hydrogen, B' is a radical of formula (a), (b), (c) or (d), with the proviso that when B' is a radical of formula (b), Y$_1$ is Y$_1$', and X, Z$_1$, Z$_2$, M$\oplus$, R$_6$ and R$_7$ are as defined above.

Especially preferred complexes of formulae Ia and Ib are those wherein one of R$_6$ and R$_7$ is hydrogen and the other is hydrogen, chlorine, methyl or methoxy, more preferably hydrogen, chlorine or methyl.

Especially preferred complexes of formulae Ia and Ic are those in which each of Z$_1$ and Z$_2$ are Z$_1$' and Z$_2$', i.e. they are both hydrogen; one is hydrogen and the other is chlorine or methyl; they are both chlorine in the 2,3-, 2,4-, 2,5-, 2,6- or 3,4- positions; they are both methyl in the 2,3-, 2,4-, 2,5-, 2,6- or 3,5-positions; or they are both other than hydrogen and signify 3-, 4- or 5-chloro-2-methyl.

Interesting compounds of formula Ia, Ib or Ic are those where X is nitro.

The present invention also provides a process for the production of complexes or mixtures of complexes of formula I comprising (a) reacting a compound of formula II, in free acid or salt form,

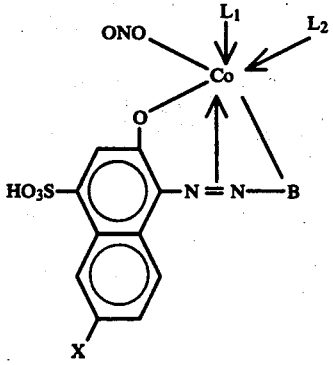

in which L$_1$ and L$_2$ are monodentate ligands and X and B are as defined above, or a mixture of compounds of formula II, with a compound of formula III,

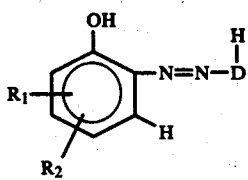

in which R$_1$, R$_2$ and D are as defined above, or a mixture of compounds of formula III, or (b) reacting a corresponding nitrite-containing cobalt complex of a compound of formula III, or a mixture thereof, with a compound of formula IV, in free acid or salt form,

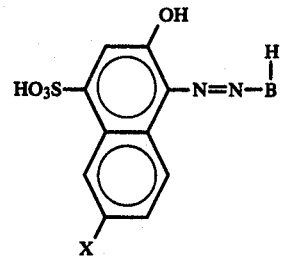

in which X and B are as defined above, or a mixture thereof, any sulpho group in the free acid form being converted into salt form.

The reaction is suitably carried out by employing the reactants in stoichiometric amounts. Suitable monodentate ligands are colourless inorganic or organic molecules which contain an oxygen or nitrogen group with electron-donating properties, in particular water molecules. The reaction may be carried out in aqueous, aqueous/organic or organic medium. Examples of organic solvents include low molecular weight carboxylic acid amides such as formamide or an alkylated derivative thereof, glycols such as ethylene glycol, di- or triethyleneglycol or ether derivatives thereof. The reactions are suitably conducted in neutral or alkaline medium and is completed after all the 1:1 complex has been reacted. The product obtained may be isolated in conventional manner, for example by salting out of weakly acidifying, and after washing with a concentrated salt solution may be collected and dried.

Process (a) is preferred.

The obtained asymmetric complexes are at least substantially pure asymmetric complexes, that is, the complexes contain less than 10% of the possible symmetric complexes.

The 1:1 cobalt complex - starting materials may be produced by reacting a compound of formula III or IV, as the case may be, with a cobalt-donating compound in the form of a cobalt(II) salt in the presence of an inorganic nitrite. Suitably the compound of formula III or IV is reacted with the cobalt-donating compound in a 1:1 molar ratio. Preferably 2 to 6 moles of nitrite per gram atom cobalt are used. The metallization may be conducted in conventional manner.

Depending on the reaction and isolation conditions (e.g. addition of base to obtain an alkaline pH or the salt used to salt-out the product) a complex of formula I is obtained in which M$\oplus$ is preferably an alkali metal cation, such as lithium, sodium or potassium, or an ammonium ion and in which the salt form of the sulpho group is the same as or different than M$\oplus$. When a weak acid is used a complex is obtained in which M$\oplus$ is hydrogen and the sulpho group is in salt form. The hydrogen ion may be replaced by an alkali metal cation or quaternary ammonium ion by the addition of alkali metal hydroxides or organic amines. It will be appreciated that the cation of the sulpho group may also be replaced at the same time.

The compounds of formula II, III and IV are known or may be prepared in conventional manner from known starting materials.

The complexes of formula I and mixtures thereof are useful for dyeing and printing nitrogen-containing organic substrates. Examples of suitable substrates are those which consist of or comprise natural or synthetic polyamides such as wool, silk or nylon, polyurethane or leather.

The dyeings obtained exhibit notable light and wet fastness, especially wash fastness. They also exhibit notable rubbing, potting, sweat and milling fastness and resistance to carbonization, ironing, wool chlorination and the action of acids and alkalis.

The dyestuffs build up from a neutral medium on polyamide fibres, the build-up being tone-in-tone due to their pure asymmetric character. The dyestuffs also build-up equally on wool and nylon when dyed together. The dyestuffs are suitable for use in combination with other 1:2 metal complexes. The complexes may be formed into stable printing pastes which build-up well on all types of polyamides.

The complexes of formula I which are well soluble in water, i.e. those in which M⊕ is other than hydrogen or an amine such as N-ethyl-N-hexylamine, cyclohexylamine, N,N-dicyclohexylamine or cyclic amines such as morpholine in quaternary form are also useful for dyeing metals, especially anodized aluminum.

The complexes of formula I which are scarcely soluble in water, as given above, may also be used in the preparation of printing lacquers and ball-point pen inks.

The dyes according to the invention may be employed as such or in the form of liquid or solid preparations.

Preferably water-soluble organic solvents optionally mixed with water are used for the liquid preparations which are in the form of stable concentrated stock solutions; conventional additives such as dissolving agents (e.g. urea or alkali reacting organic or inorganic substances) may be added thereto. The stock solutions may be diluted with water. Such preparations may be made, for example, in accordance with the procedure described in German Patent 1,619,470 or in German Patent Application No. 2,033,989. Also concentrated stable aqueous preparations which contain conventional additives may be used.

Solid preparations which are in powder or granulate form with an average particle size of at least 20μ can be used, which preparations contain conventional additives such as standardization agents. Such solid preparations may be made for example in accordance with the procedure described in British Pat. No. 1,370,845. The solid preparations are well soluble in water whereby the exact quantity of dye preparation needed in the dyebath may be added thereto.

The following Examples further serve to illustrate the invention. In the Examples the temperatures are in degrees Centigrade and the parts are by weight.

EXAMPLE 1

45 Parts of the dyestuff obtained by the acid coupling of diazotised 2-amino-1-hydroxy-4,6-dinitrobenzene with 2-(3'-chlorophenyl)-aminonaphthalene and the paste of the 1:1 cobalt complex obtained from 44 parts of the monoazo dyestuff of 1-amino-2-hydroxy-6-nitronaphthalene-4-sulphonic acid → 2-hydroxynaphthalene are stirred into 600 parts of water and 300 parts of ethanol, and this is set at a pH of 11.0–11.5 by adding sodium hydroxide solution. The reaction mixture is heated to 30° and stirred at this temperature for 24 hours. If any starting material remains after this time the temperature is raised to 80° C. and stirring is continued until the disappearance of both starting materials. The pH is maintained at 11–11.5 during the whole reaction. The chromatograph of the asymmetrical 1:2 cobalt complex thus formed must show no more or very little traces of the metal-free dyestuff and none of 1:1 cobalt complex. The dyestuff is salted out by adding sodium chloride, it is filtered, washed with a 5% sodium chloride solution and dried. It corresponds to the formula

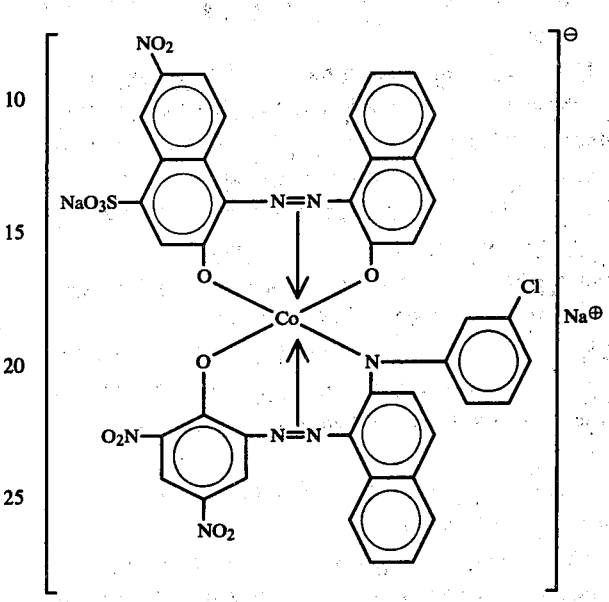

and has a very high degree of purity (in all at most 5% of symmetrical complexes). The dyestuff is well soluble in water and dyes natural and synthetic polyamide fibres such as wool and nylon in a grey or black shade, the dyestuff being absorbed from a neutral bath in an even manner.

The dyeing has good all-round wet fastness and notable light fastness, as well as notable fastness to rubbing. The 1:1 cobalt complex used as the starting material may be produced as follows:

28 parts of cobalt-(II)-sulphate.7H$_2$O and 28 parts of sodium nitrite are dissolved in a beaker in 500 parts of water. Then, 44 parts of the monoazo dyestuff 1-amino-2-hydroxy-6-nitronaphthalene-4-sulphonic acid → 2-hydroxynaphthalene are entered with good stirring. The pH is set at 5.5 – 6.0 during and after addition of the monoazo dyestuff and is kept in this range for about 20 hours until the initial dyestuff has been completely converted into the 1:1 cobalt complex. During metallisation, the temperature must be maintained at between 20 and 30°. The 1:1 cobalt complex is precipitated by salting out with sodium chloride solution until the filtrate is free from cobalt. The paste of the 1:1 cobalt complex obtained may be used directly for the reaction to form the asymmetrical 1:2 cobalt complex.

In the following Table the structural formulae of further dyestuffs which may be prepared in analogy with the procedure described in Example 1 are given. The dyestuffs in the Table give dyeings on polyamide which have similar properties to the dyeing obtained with the dyestuff of Example 1. The dye shade obtained in each case is indicated by the letters a to i given in column I wherein a is black,
b is reddish black,
c is greenish black,
d is bluish black,
e is brown, f is red-brown,
g is bordeaux,
h is red-bordeaux, and
i is rubine.

| Ex. No. | Compound of formula IV in the form of 1:1 Co-complex | Compound of formula III in metal-free form | I |
|---|---|---|---|
| 2 | 1-amino-2-hydroxy-6-nitro-naphthalene-4-sulphonic acid →2-hydroxynaphthalene | 2-amino-4-chloro-1-hydroxy-6-nitrobenzene → 2-phenylaminonaphthalene | a |
| 3 | " | 2-amino-4,6-dinitro-1-hydroxybenzene → 2-aminonaphthalene | a |
| 4 | " | 2-amino-4,6-dinitro-1-hydroxy-benzene → naphthalene | a |
| 5 | " | 2-amino-1-hydroxybenzene → 2-phenylamino-naphthalene | e |
| 6 | " | 2-amino-1-hydroxy-4-methyl-6-nitrobenzene → 2-(4'-chlorophenyl)aminonaphthalene | a |
| 7 | " | 2-amino-1-hydroxy-4-methoxy-benzene→ 2-phenylamino-naphthalene | a |
| 8 | " | 2-amino-1-hydroxybenzene-4-sulphonic acid amide → 2-(2',6'-dimethylphenyl)aminonaphthalene | b |
| 9 | " | 2-amino-1-hydroxybenzene-4-N-(3'-methoxypropyl)sulphonic acid amide → 2-phenyl-aminonaphthalene | b |
| 10 | " | 2-amino-1-hydroxybenzene-4-N-phenyl sulphonic acid amide → 2-phenylaminonaphthalene | b |
| 11 | " | 2-amino-1-hydroxybenzene-5-N-methyl sulphonic acid amide → 2-(4'-methylphenyl)-aminonaphthalene | a |
| 12 | " | 2-amino-1-hydroxybenzene-4-N-(2'-hydroxypropyl)sulphonic acid amide → 2-phenyl-aminonaphthalene | b |
| 13 | " | 2-amino-4-chloro-1-hydroxy-benzene-5-sulphonic acid amide → 2-phenylaminonaphthalene | a |
| 14 | 1-amino-2-hydroxy-6-nitro-naphthalene-4-sulphonic acid → 2-hydroxynaphthalene | 2-amino-4,6-dinitro-1-hydroxy-benzene → 2-aminonaphthalene-6-N-(2'-hydroxypropyl)sulphonic acid amide | a |
| 15 | " | 2-amino-4,6-dinitro-1-hydroxy-benzene → 2-ethylamino-naphthalene | a |
| 16 | " | 2-amino-1-hydroxy-5-nitro-benzene → 3-methyl-1-phenyl-5-aminopyrazole | e |
| 17 | " | 2-amino-4,6-dinitro-1-hydroxy-benzene → 3-methyl-1-phenyl-5-aminopyrazole | f |
| 18 | 1-amino-2-hydroxy-6-nitro-naphthalene-4-sulphonic acid → 2-hydroxynaphthalene and 1-amino-2-hydroxynaphthalene-4-sulphonic acid → 2-hydroxynaphthalene | 2-amino-4,6-dinitro-1-hydroxy-benzene → 2-(3'-chloro-phenyl)aminonaphthalene | a |
| 19 | 1-amino-2-hydroxynaphthalene-4-sulphonic acid → 2-hydroxynaphthalene | " | |
| 20 | " | 2-amino-4,6-dichloro-1-hydroxy-benzene → 2-phenylaminonaph-thalene and 2-amino-4,6-dinitro-1-hydroxy-benzene → 2-phenylaminonaph-thalene | a |
| 21 | " | 2-amino-4,6-dinitro-1-hydroxy-benzene → 2-aminonaphthalene | d |
| 22 | " | 2-amino-4,6-dinitro-1-hydroxy-benzene → 2-phenylamino- | a |

-continued

| Ex. No. | Compound of formula IV in the form of 1:1 Co-complex | Compound of formula III in metal-free form | I |
|---|---|---|---|
| 23 | " | naphthalene 2-amino-1-hydroxybenzene-4-N-phenylsulphonic acid amide → 2-phenylaminonaphthalene | b |
| 24 | " | 2-amino-hydroxy-5-nitrobenzene → 3-methyl-1-(2',5'-dichlorophenyl)-5-aminopyrazole | g |
| 25 | " | 2-amino-4,6-dinitro-1-hydroxybenzsene → 3-methyl-1-phenyl-5-aminopyrazole | i |
| 26 | 1-amino-2-hydroxy-6-nitronaphthalene-4-sulphonic acid → 1-hydroxy-4-methoxynaphthalene | 2-amino-4,6-dinitro-1-hydroxybenzene → 2-phenylaminonaphthalene | c |
| 27 | 1-amino-2-hydroxy-6-nitronaphthalene-4-sulphonic acid → 1-hydroxy-4-methylnaphthalene | 2-amino-1-hydroxybenzene-4-sulphonic acid morpholine → 2-phenylaminonaphthalene | a |
| 28 | " | 2-amino-1-hydroxybenzene-4-N-phenylsulphonic acid amide → 3-methyl-1-phenyl-5-aminopyrazole | g |
| 29 | 1-amino-2-hydroxynaphthalene-4-sulphonic acid → 1-hydroxy-4-methoxynaphthalene | 2-amino-4,6-dinitro-1-hydroxybenzene → 2-phenylaminonaphthalene | a |
| 30 | 1-amino-2-hydroxynaphthalene-4-sulphonic acid → 1-hydroxy-4-methylnaphthalene | 2-amino-6-chloro-4-nitro-1-hydroxybenzene → 2-phenylaminonaphthalene | a |
| 31 | 1-amino-2-hydroxynaphthalene-4-sulphonic acid → 1-hydroxy-5-chloronaphthalene | 2-amino-4,6-dinitro-1-hydroxybenzene → 2-phenylaminonaphthalene | a |
| 32 | 1-amino-2-hydroxynaphthalene-4-sulphonic acid → 1-hydroxy-5,8-dichloronaphthalene | 2-amino-4,6-dinitro-1-hydroxybenzene → 2-ethylaminonaphthalene | a |
| 33 | " | 2-amino-1-hydroxybenzene-4-N,N-diethyl sulphonic acid amide → 2-phenylaminonaphthalene | b |
| 34 | " | 2-amino-4-chloro-6-nitro-1-hydroxybenzene → 3-methyl-1-(4'-methylphenyl)-5-amino pyrazole | e |
| 35 | 1-amino-2-hydroxy-6-nitronaphthalene-4-sulphonic acid → 1-hydroxy-5,8-dichloronaphthalene | 2-amino-4,6-dichloro-1-hydroxybenzene → 2-phenylaminonaphthalene | b |
| 36 | " | 2-amino-4,6-dinitro-1-hydroxybenzene → 2-(3'-chlorophenyl)aminonaphthalene | a |
| 37 | " | 2-amino-4,6-dichloro-1-hydroxybenzene → 3-methyl-1-(3'-chlorophenyl)-5-aminopyrazole | f |
| 38 | 1-amino-2-hydroxy-6-nitronaphthalene-4-sulphonic acid → 2-hydroxynaphthalene | 2-amino-4-chloro-1-hydroxy-5-nitrobenzene → 2-phenylaminonaphthalene | d |
| 39 | " | 2-amino-4-chloro-1-hydroxy-5-nitrobenzene → 2-(3'-chlorophenyl)aminonaphthalene | d |
| 40 | " | 2-amino-4-chloro-1-hydroxy-5-nitrobenzene → 2-aminonaphthalene | d |
| 41 | " | 2-amino-4-chloro-1-hydroxy-5-nitrobenzene → 3-methyl-1-phenyl-5-aminopyrazole | g |
| 42 | " | 2-amino-1-hydroxy-5-nitrobenzene → 2-phenylaminonaphthalene | d |
| 43 | " | 2-amino-1-hydroxy-5-nitrobenzene → 2-(3'-chlorophenyl)aminonaphthalene | d |
| 44 | 1-amino-2-hydroxynaphthalene-4-sulphonic acid → 2-hydroxynaphthalene | 2-amino-4-chloro-1-hydroxy-5-nitrobenzene → 2-phenylaminonaphthalene | d |
| 45 | " | 2-amino-4-chloro-1-hydroxy-5-nitrobenzene → 3-methyl-1-phenyl-5-aminopyrazole | d |
| 46 | " | 2-amino-1-hydroxy-5-nitrobenzene → 2-phenylaminonaphthalene | d |
| 47 | " | 2-amino-1-hydroxy-5-nitrobenzene → 3-methyl-1- | g |

| Ex. No. | Compound of formula IV in the form of 1:1 Co-complex | Compound of formula III in metal-free form | I |
|---|---|---|---|
| 48 | " | phenyl-5-aminopyrazole 2-amino-1-hydroxy-5-nitro-benzene → 2-aminonaphthalene | d |
| 49 | 1-amino-2-hydroxy-6-nitro-naphthalene-4-sulphonic acid → 1-hydroxynaphthalene | 2-amino-1-hydroxy-4-chloro-5-nitrobenzene → 2-phenylaminonaphthalene | d |
| 50 | 1-amino-2-hydroxy-6-nitro-naphthalene-4-sulphonic acid → 2-hydroxynaphthalene | 2-amino-1-hydroxy-5-nitro-benzene → 2-aminonaphthalene-6-N-(2'-hydroxypropyl)sulphonic acid amide | d |

APPLICATION EXAMPLE A 0.03 g (to obtain a grey shade) or 0.15 g (to obtain a black shade) of the dyestuff obtained in Example 1 is dissolved in 300 parts of water, and 0.2 g of ammonium sulphate is added. Subsequently, the moistened material (5 g of wool gabardine or 5 g of nylon satin) is entered into the bath and is heated to boiling temperature over the course of 30 minutes. The water which is evaporated during the 30 minutes boiling is replaced and dyeing is completed at boiling temperature for another 30 minutes, with subsequent rinsing. After drying, a grey or black dyeing with notable wet and light fastness is obtained.

The dyestuffs of Examples 2 to 50 may be used for dyeing in analagous manner to that described above.

APPLICATION EXAMPLE B

Polyamide is printed with a printing paste containing the following:
50 parts dyestuff of Example 4
50 parts urea
50 parts dissolving agent, for example thiodiethylglycol
300 parts water
500 parts suitable thickening agent, for example based on locust bean gum
60 parts acid acceptor for example, ammonium tartrate and
60 parts thiourea The printed goods are steamed for 40 minutes at 102° (saturated steam), then rinsed with cold water, washed for 5 minutes at 60° with a dilute solution of a conventional detergent and then rinsed again. A black print with good wet- and light-fastness is obtained.

In analogous manner printing pastes may be made using the dyestuffs of Examples 1 to 3 and 5 to 50.

What is claimed is:

1. A complex of the formula

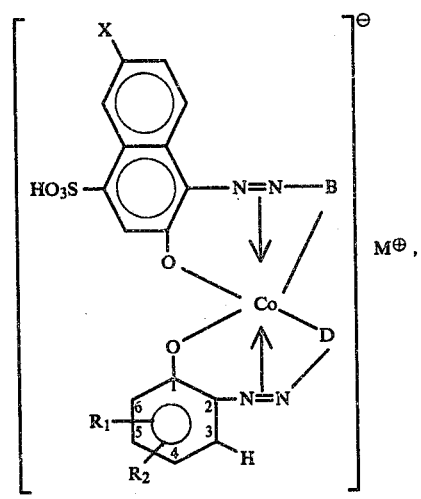

said complex being at least substantially pure, or a mixture of such complexes, wherein $R_1$ is hydrogen, $C_{1-4}$alkyl, $C_{1-4}$alkoxy, chloro, bromo or nitro, $R_2$ is hydrogen, $C_{1-4}$alkyl, $C_{1-4}$alkoxy, chloro, bromo, nitro or $-SO_2NR_3R_4$, wherein $R_3$ is hydrogen, $C_{1-4}$alkyl or $C_{1-4}$alkyl substituted by 1 or 2 substituents each of which is independently halo, hydroxy, cyano, $C_{1-4}$alkoxy or phenyl, and $R_4$ is hydrogen; $C_{1-4}$alkyl; $C_{1-4}$alkyl substituted by 1 or 2 substituents each of which is independently halo, hydroxy, cyano, $C_{1-4}$alkoxy or phenyl; $C_{5-7}$cycloalkyl; $C_{5-7}$cycloalkyl substituted by 1 to 3 methyl groups; phenyl or phenyl substituted by 1 to 3 substituents each of which is independently halo, $C_{1-4}$alkyl, $C_{1-4}$alkoxy or nitro, with the proviso that the maximum number of nitro substituents is 2, or $R_3$ and $R_4$ taken together and with the nitrogen atom to which they are joined are pyrrolidino, piperidino or morpholino, with the proviso that when $R_2$ is $-SO_2NR_3R_4$, $R_1$ must be hydrogen, chloro or nitro and one of $R_1$ and $R_2$ must be in the 4-position and the other must be in the 5-position, B is 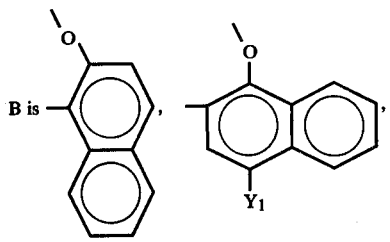

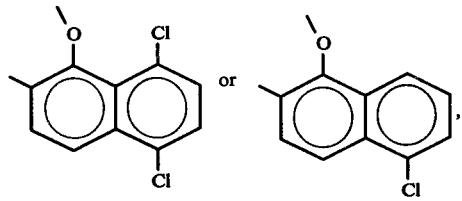

wherein $Y_1$ is hydrogen, $C_{1-2}$alkyl, $C_{1-2}$alkoxy, chloro or bromo,

D is 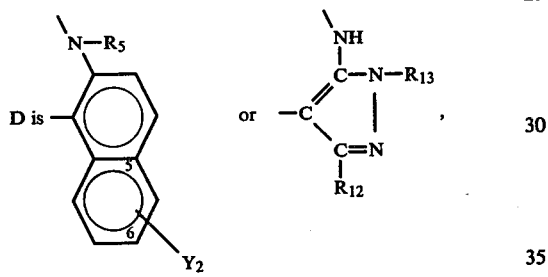

wherein $R_5$ is hydrogen, $C_{1-4}$alkyl,

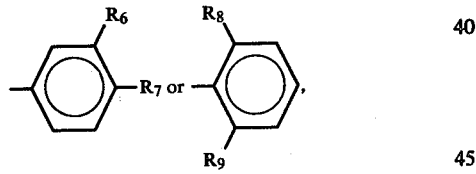

wherein one of $R_6$ and $R_7$ is hydrogen and the other is hydrogen, chloro, bromo, $C_{1-2}$alkyl, $C_{1-2}$alkoxy or trifluoromethyl, $R_8$ is hydrogen or methyl, and $R_9$ is methyl, chloro or bromo, with the proviso that $R_8$ must be hydrogen when $R_9$ is chloro or bromo, $R_{12}$ is hydrogen, $C_{1-4}$alkyl, $C_{1-2}$alkoxy or phenyl, $R_{13}$ is hydrogen; $C_{1-4}$alkyl; phenyl($C_{1-4}$alkyl); 2-pyridyl; cyclohexyl; phenyl; phenyl monosubstituted by fluoro, chloro, bromo, $C_{1-4}$alkyl, $C_{1-2}$alkoxy, nitro or trifluoromethyl; 2,3-, 2,4-, 2,5-, 2,6- or 3,4-dichlorophenyl; 2,4- or 3,5-dibromophenyl; 2,3-, 2,4-, 2,5-, 2,6- or 3,5-dimethylphenyl; 3,4-dimethoxyphenyl; 3-, 4- or 5-chloro-2-methylphenyl; 4-bromo-2-methylphenyl or 5-chloro-2-methoxyphenyl, and $Y_2$ is hydrogen or 5- or 6-SO$_2$NHR$_{10}$, wherein $R_{10}$ is hydrogen, $C_{1-4}$alkyl or $C_{2-4}$hydroxyalkyl, X is hydrogen or nitro, M⊕ is hydrogen or an equivalent of a non-chromophoric cation, and M is an equivalent of a non-chromophoric cation, with the provisos that (i) $Y_2$ must be hydrogen when $R_2$ is —SO$_2$NR$_3$R$_4$ and (ii) the complex is free of

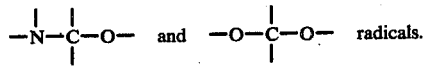 radicals.

2. A complex according to claim 1, or a mixture of such complexes, wherein M⊕ is hydrogen, lithium, sodium, potassium, N⊕(R)$_4$, C$_{5-12}$alkylammonium, C$_{5-8}$cycloalkylammonium, diC$_{5-8}$cycloalkylammonium, N-ethyl-N-hexylammonium or morpholinium, and M is lithium, sodium, potassium, N⊕(R)$_4$, C$_{5-12}$alkylammonium, C$_{5-8}$cycloalkylammonium, diC$_{5-8}$cycloalkylammonium, N-ethyl-N-hexylammonium or morpholinium, wherein each R is independently hydrogen, C$_{1-3}$alkyl or C$_{2-4}$hydroxyalkyl, with the proviso that at least one R is hydrogen when any R is C$_{2-4}$hydroxyalkyl.

3. A complex according to claim 1 wherein D is

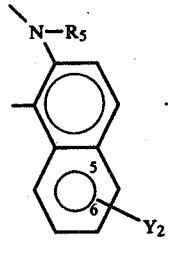

4. A complex according to claim 1 wherein D is

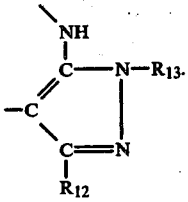

5. A complex according to claim 1, or a mixture of such complexes, wherein $R_1$ is hydrogen, methyl, chloro or nitro, and $R_2$ is chloro, nitro or —SO$_2$NHR$_4''$, wherein $R_4''$ is methyl, ethyl, isopropyl, 2-hydroxyethyl, 2-hydroxy-n-propyl, 3-methoxypropyl or phenyl, with the proviso that when $R_2$ is —SO$_2$NHR$_4''$, $R_1$ must be hydrogen.

6. A complex according to claim 5, or a mixture, of such complexes, wherein $R_5$ is hydrogen, phenyl, 2-, 3- or 4-chlorophenyl, 2- or 4-methylphenyl or 2,6-dimethylphenyl, and $Y_2$ is hydrogen or 5- or 6-SO$_2$NHR$_{10}'$, wherein $R_{10}'$ is hydrogen, methyl or β-C$_{2-3}$hydroxyalkyl.

7. A complex according to claim 6, or a mixture of such complexes, wherein D is is 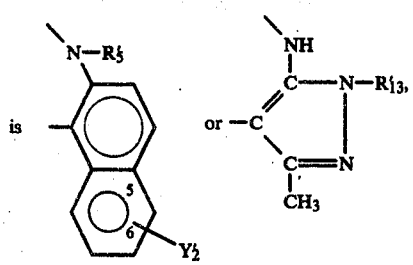

wherein $R_5'$ is hydrogen, phenyl, 2- 3- or 4-chlorophenyl, 2- or 4-methylphenyl or 2,6-dimethylphenyl, $R_{13}'$ is phenyl; phenyl monosubstituted by fluoro, chloro, bromo, $C_{1-4}$alkyl, $C_{1-2}$alkoxy, nitro or trifluoromethyl; 2,3-, 2,4-, 2,5-, 2,6- or 3,4-dichlorophenyl; 2,4- or 3,5-dibromophenyl; 2,3-, 2,4-, 2,5-, 2,6- or 3,5-dimethylphenyl; 3,4-dimethoxyphenyl; 3-, 4- or 5-chloro-2-methylphenyl, 4-bromo-2-methylphenyl or 5-chloro-2-methoxyphenyl, and $Y_2'$ is hydrogen or 5- or 6-$SO_2NHR_{10}'$, wherein $R_{10}'$ is hydrogen, methyl or $\beta$-$C_{2-3}$hydroxyalkyl.

8. A complex according to claim 7 wherein D is

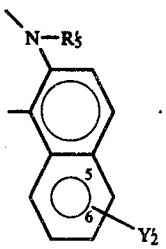

9. A complex according to claim 7 wherein D is

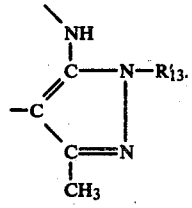

10. A complex according to claim 1 having the formula

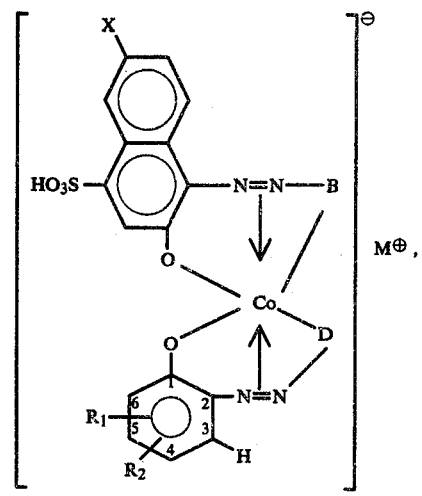

or a mixture of such complexes, wherein $R_1$ is hydrogen, $C_{1-4}$alkyl, $C_{1-4}$alkoxy, chloro, bromo or nitro, $R_2$ is hydrogen, $C_{1-4}$alkyl, $C_{1-4}$alkoxy, chloro, bromo, nitro or -$SO_2NR_3R_4$, wherein $R_3$ is hydrogen, $C_{1-4}$alkyl or $C_{1-4}$alkyl substituted by 1 or 2 substituents each of which is independently halo, hydroxy, cyano, $C_{1-4}$alkoxy or phenyl, and $R_4$ is hydrogen; $C_{1-4}$alkyl; $C_{1-4}$alkyl substituted by 1 to 2 substituents each of which is independently halo, hydroxy, cyano, $C_{1-4}$alkoxy or phenyl; $C_{5-7}$cycloalkyl; $C_{5-7}$cycloalkyl substituted by 1 to 3 methyl groups; phenyl or phenyl substituted by 1 to 3 substituents each of which is independently halo, $C_{1-4}$alkyl, $C_{1-4}$alkoxy or nitro, with the proviso that the maximum number of nitro substituents is 2, or $R_3$ and $R_4$ taken together and with the nitrogen atom to which they are joined are pyrrolidino, piperidino or morpholino, with the proviso that when $R_2$ is —$SO_2NR_3R_4$, $R_1$ must be hydrogen, chloro or nitro and one of $R_1$ and $R_2$ must be in the 4-position and the other must be in the 5-position, B is 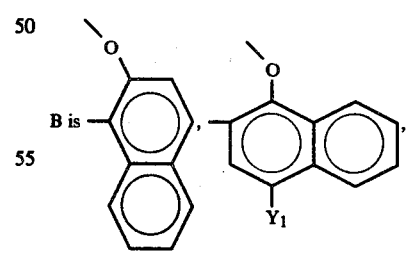

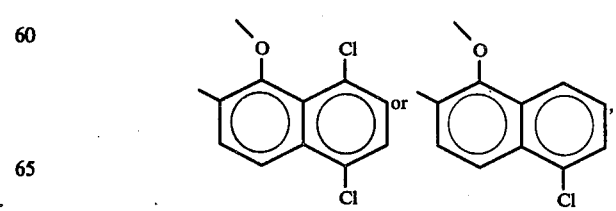

wherein $Y_1$ is hydrogen, $C_{1-2}$alkyl, $C_{1-2}$alkoxy, chloro or bromo,

D is 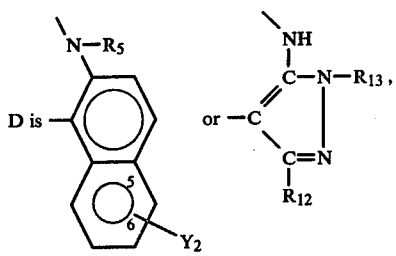

wherein
$R_5$ is hydrogen, $C_{1-4}$alkyl,

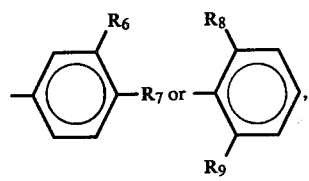

wherein one of $R_6$ and $R_7$ is hydrogen and the other is hydrogen, chloro, bromo, $C_{1-2}$alkyl, $C_{1-2}$alkoxy or trifluoromethyl, $R_8$ is hydrogen or methyl, and $R_9$ is methyl, chloro or bromo, with the proviso that $R_8$ must be hydrogen when $R_9$ is chloro or bromo, $R_{12}$ is hydrogen, $C_{1-4}$alkyl, $C_{1-2}$alkoxy or phenyl, $R_{13}$ is hydrogen; $C_{1-4}$alkyl; phenyl-($C_{1-4}$alkyl); 2-pyridyl; cyclohexyl; phenyl; phenyl monosubstituted by fluoro, chloro, bromo, $C_{1-4}$alkyl, $C_{1-2}$alkoxy, nitro or trifluoromethyl; 2,3-, 2,4-, 2,5-, 2,6- or 3,4- dichlorophenyl; 2,4- or 3,5-dibromophenyl; 2,3-, 2,4-, 2,5-, 2,6- or 3,5-dimethylphenyl; 3,4- dimethoxyphenyl; 3-, 4- or 5-chloro-2-methylphenyl; 4-bromo-2-methylphenyl or 5-chloro-2-methoxyphenyl, and $Y_2$ is hydrogen or 5- or 6-$SO_2NHR_{10}$, wherein $R_{10}$ is hydrogen, $C_{1-4}$alkyl or $C_{2-4}$hydroxyalkyl, X is hydrogen or nitro, $M^\oplus$ is hydrogen or an equivalent of a non-chromophoric cation, and M is an equivalent of a non-chromophoric cation, with the provisos that (i) $Y_2$ must be hydrogen when $R_2$ is $-SO_2NR_3R_4$ and (ii) $Y_2$ must be 5- or 6-$SO_2NHR_{10}$ when B is

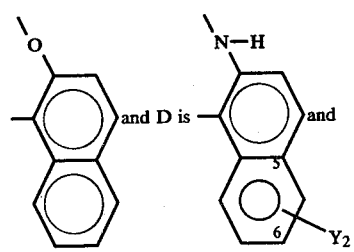

(iii) the complex if free of

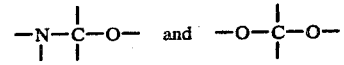

radicals.

11. A complex according to claim 10, or a mixture of such complexes, wherein
$R_5$ is hydrogen, phenyl, 2-, 3- or 4-chlorophenyl, 2- or 4-methylphenyl or 2,6-dimethylphenyl, and
$Y_2$ is hydrogen or 5- or 6-$SO_2NHR_{10}'$, wherein $R_{10}'$ is hydrogen, methyl or $\beta$-$C_{2-3}$-hydroxyalkyl.

12. A complex according to claim 10, of a mixture of such complexes, wherein one of $R_6$ and $R_7$ is hydrogen and the other is hydrogen, chloro, methyl or methoxy.

13. A complex according to claim 12, or a mixture of such complexes, wherein one of $R_6$ and $R_7$ is hydrogen and the other is hydrogen, chloro or methyl.

14. A complex according to claim 10, or a mixture of such complexes, wherein D is

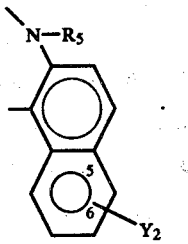

15. A complex according to claim 14 having the formula

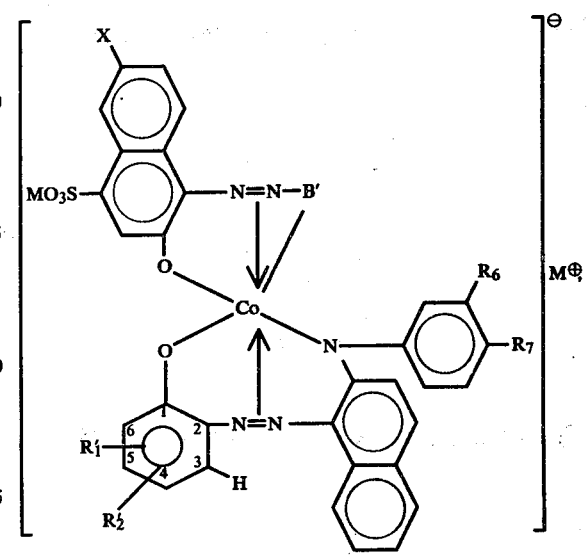

or a mixture of such complexes, wherein
$R_1'$ is hydrogen, methyl, chloro or nitro,
$R_2'$ is chloro, nitro or -$SO_2NHR_4''$ wherein $R_4''$ is methyl, ethyl, isopropyl, 2-hydroxyethyl, 2-hydroxy-n-propyl, 3-methoxypropyl or phenyl, with the proviso that when $R_2'$ is -$SO_2NHR_4''$, it must be in the 4- or 5-position and $R_1'$ must be hydrogen, one of $R_6$ and $R_7$ is hydrogen and the other is hydrogen, chloro, bromo, $C_{1-2}$alkyl, $C_{1-2}$alkoxy or trifluoromethyl, B' is 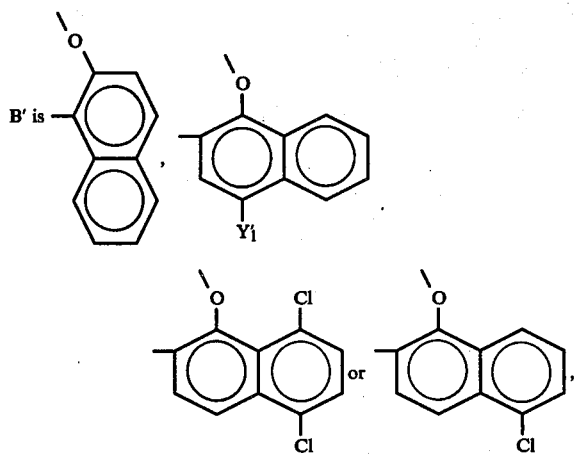, wherein $Y_1'$ is hydrogen, methyl or methoxy, X is hydrogen or nitro, $M^{\oplus}$ is hydrogen or an equivalent of a non-chromophoric cation, and M is an equivalent of a non-chromophoric cation, with the proviso that the complex is free of

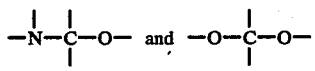

radicals.

16. A complex according to claim 15, or a mixture of such complexes, wherein $R_1'$ is hydrogen, chloro or nitro.

17. A complex according to claim 16 having the formula

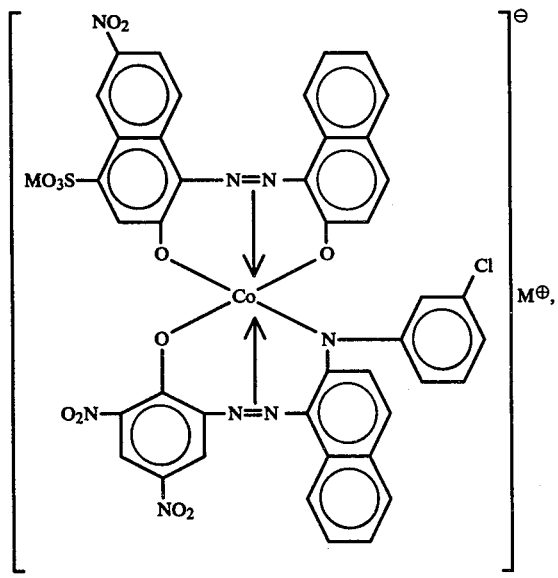

wherein $M^{\oplus}$ is hydrogen or an equivalent of a non-chromophoric cation, and M is an equivalent of a non-chromophoric cation.

18. A complex according to claim 16 having the formula

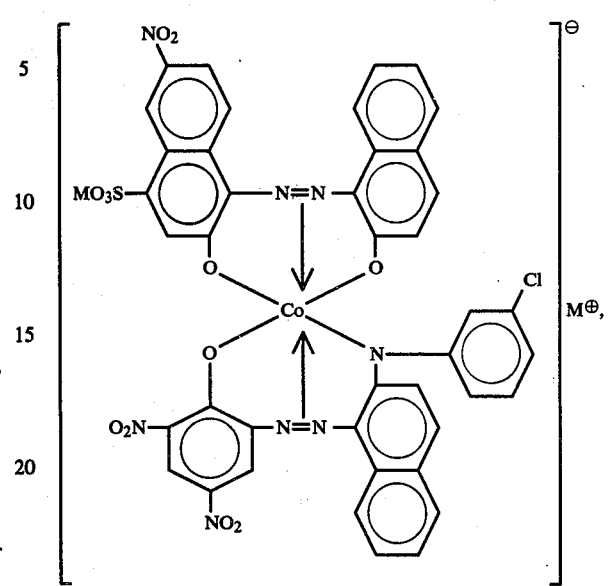

wherein $M^{\oplus}$ is hydrogen or an equivalent of a non-chromophoric cation, and M is an equivalent of a non-chromophoric cation.

19. A complex according to claim 16 having the formula

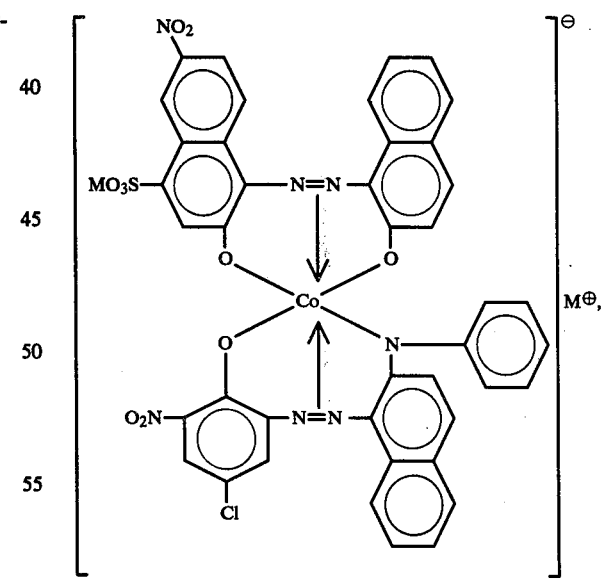

wherein $M^{\oplus}$ is hydrogen or an equivalent of a non-chromophoric cation, and M is an equivalent of a non-chromophoric cation.

20. A complex according to claim 16 having the formula

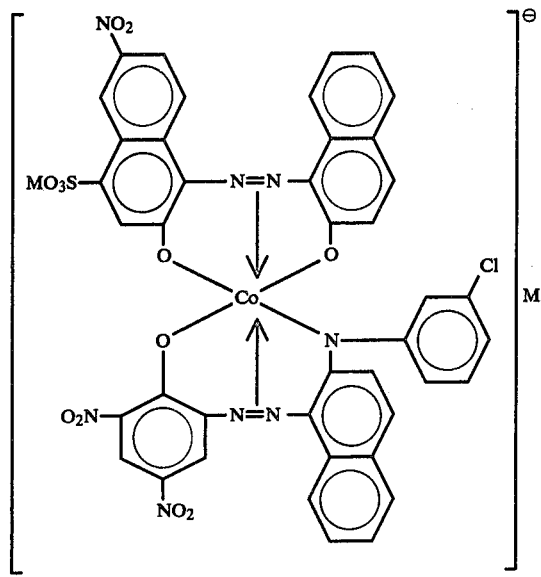

wherein M⊕ is hydrogen or an equivalent of a non-chromophoric cation, and

M is an equivalent of a non-chromophoric cation.

21. A complex according to claim 16 having the formula

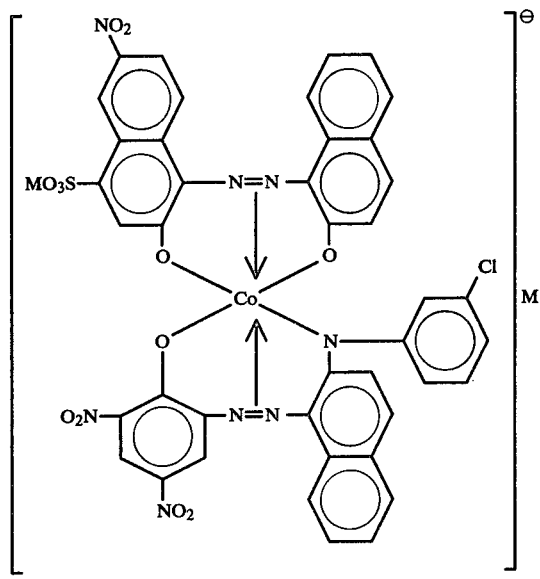

wherein

M⊕ is hydrogen or an equivalent of a non-chromophoric cation, and

M is an equivalent of a non-chromophoric cation.

22. A complex according to claim 16 having the formula

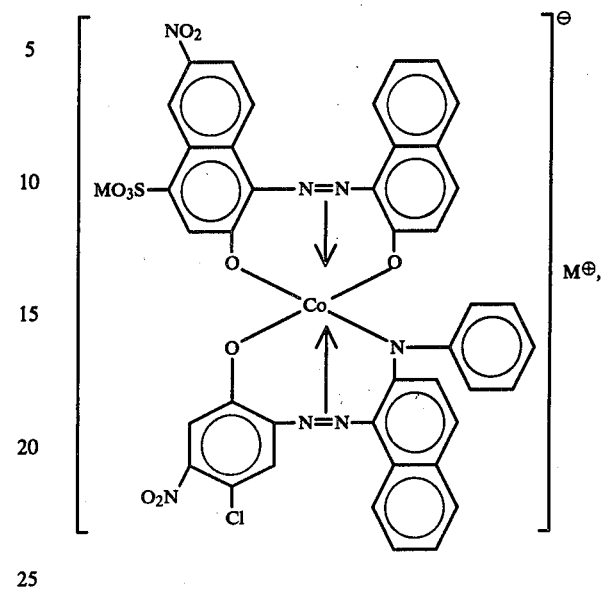

wherein M⊕ is hydrogen or an equivalent of a non-chromophoric cation, and

M is an equivalent of a non-chromophoric cation.

23. A complex according to claim 16 having the formula

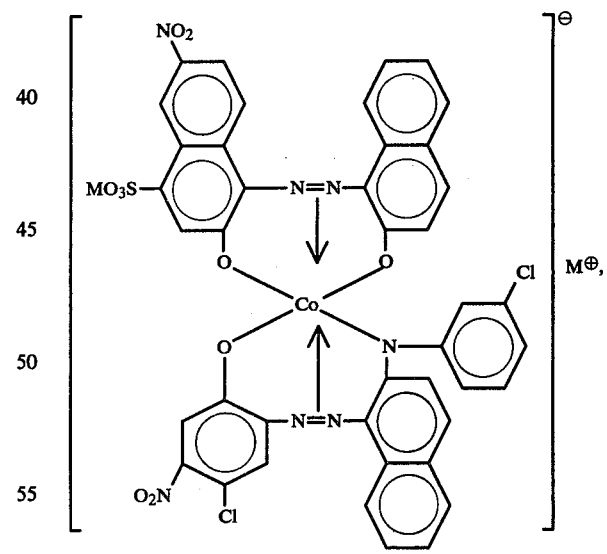

wherein

M⊕ is hydrogen or an equivalent of a non-chromophoric cation, and

M is an equivalent of a non-chromophoric cation.

24. A complex according to claim 16 having the formula

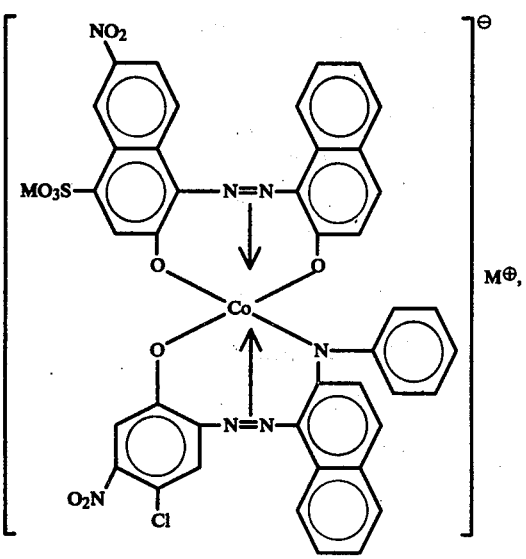

wherein

M⊕ is hydrogen or an equivalent of a non-chromophoric cation, and

M is an equivalent of a non-chromophoric cation.

25. A complex according to claim 10, or a mixture of such complexes, wherein D is

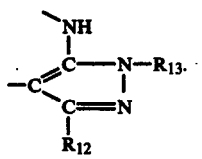

26. A complex according to claim 25 having the formula

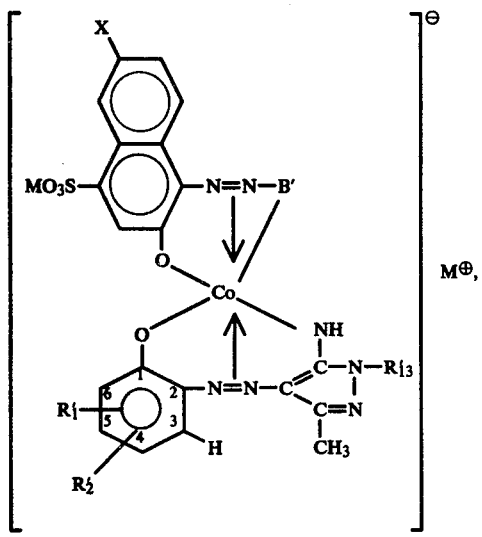

or a mixture of such complexes, wherein $R_1'$ is hydrogen, methyl, chloro or nitro, $R_2'$ is chloro, nitro or —SO$_2$NHR$_4''$, wherein R$_4''$ is methyl, ethyl, isopropyl, 2-hydroxyethyl, 2-hydroxy-n-propyl, 3-methoxypropyl or phenyl, with the proviso that when R$_2'$ is -SO$_2$NHR$_4''$, it must be in the 4- or 5-position and $R_1'$ must be hydrogen, $R_{13}'$ is phenyl; phenyl monosubstituted by fluoro, chloro, bromo, C$_{1-4}$alkyl, C$_{1-2}$alkoxy, nitro or trifluoromethyl; 2,3-, 2,4-, 2,5-, 2,6- or 3,4-dichlorophenyl; 2,4- or 3,5-dibromophenyl; 2,3-, 2,4-, 2,5-, 2,6- or 3,5-dimethylphenyl; 3,4-dimethoxyphenyl; 3-, 4- or 5-chloro-2-methylphenyl; 4-bromo-2-methylphenyl or 5-chloro-2-methoxyphenyl.

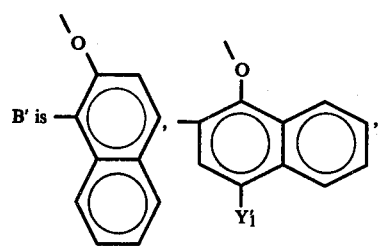

wherein $Y_1'$ is hydrogen, methyl or methoxy,

X is hydrogen or nitro,

M⊕ is hydrogen or an equivalent of a non-chromophoric cation, and

M is an equivalent of a non-chromophoric cation, with the proviso that the complex is free of

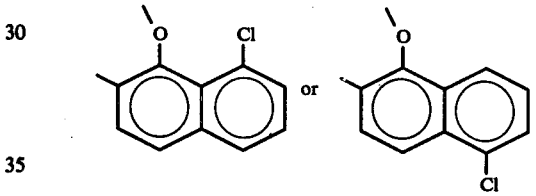

27. A complex according to claim 26, or a mixture of such complexes, wherein $R_1'$ is hydrogen, chloro or nitro.

28. A complex according to claim 26, or a mixture of such complexes, wherein $R_{13}'$ is phenyl, chlorophenyl, methylphenyl, 2,3-, 2,4-, 2,5-, 2,6-, or 3,4-dichlorophenyl, 2,3-, 2,4-, 2,5-, 2,6- or 3,5-dimethylphenyl or 3-, 4- or 5-chloro-2-methylphenyl.

29. A complex according to claim 28 having the formula

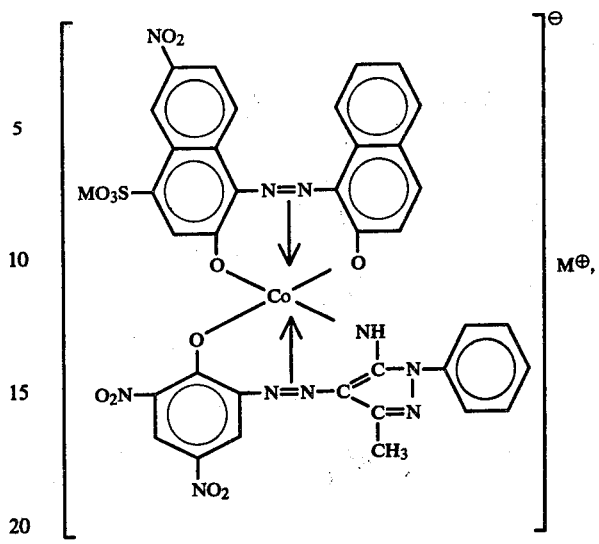
wherein
M⊕ is hydrogen or an equivalent of a non-chromophoric cation, and
M is an equivalent of a non-chromophoric cation.
* * * * *

UNITED STATES PATENT AND TRADEMARK OFFICE
CERTIFICATE OF CORRECTION

PATENT NO. : 4,159,983          Page 1 of 2
DATED      : July 3, 1979
INVENTOR(S): Jacky Dore It is certified that error appears in the above-identified patent and that said Letters Patent are hereby corrected as shown below:

Column 3, line 62, that portion of the structural formula reading "$\underset{Y_2}{\diagdown_Y}$" should read -- $\underset{6}{\overset{5}{\diagdown}}\underset{Y_2}{\diagup}$ --. Column 5, line 4, "2,3-" should read -- 2-, 3- --. Columns 13-14, Example 4, "naphthalene" should read -- 2-phenylaminonaphthalene --. Columns 15-16, Example 24, "amino-" should read -- amino-1- --. Columns 15-16, Example 25, "benzsene" should read -- benzene --. Column 18, line 24, that portion of the structural formula reading "$HO_3S-$" should read -- $MO_3S-$ --. Column 19, line 32, that portion of the left hand structural formula reading "$\underset{6}{\overset{5}{\diagdown}}\underset{Y_2}{\diagup}$" should read -- $\underset{6}{\overset{5}{\diagdown}}\underset{Y_2}{\diagup}$ --.

Column 21, line 8, delete "is". Column 22, line 9, that portion of the structural formula reading "$HO_3S-$" should read --$MO_3S-$ --. Column 23, line 65, that portion of the right hand structural formula reading "$\underset{6}{\overset{5}{\diagdown}}\underset{Y_2}{\diagup}$" should read -- $\underset{6}{\overset{5}{\diagdown}}\underset{Y_2}{\diagup}$ --.

UNITED STATES PATENT AND TRADEMARK OFFICE
CERTIFICATE OF CORRECTION

PATENT NO. : 4,159,983

DATED : July 3, 1979

INVENTOR(S) : Jacky Dore

It is certified that error appears in the above-identified patent and that said Letters Patent are hereby corrected as shown below:

Column 23, line 69, "if" should read -- is --.  Column 24, line 13, "of" (first occurrence) should read -- or --.
Column 26, line 15, delete "Cl" from the structural formula.
Column 27, line 4, delete "NO$_2$" from the structural formula.
Column 27, line 37, delete "NO$_2$" from the structural formula.
Column 27, line 47, delete "Cl" from the structural formula.
Column 29, line 3, delete "NO$_2$" from the structural formula.
Column 30, line 33, the left hand structural formula should read -- 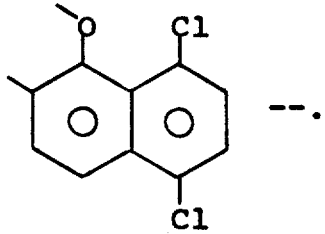 --.

Signed and Sealed this

Twenty-second Day of January 1980

[SEAL]

Attest:

SIDNEY A. DIAMOND

Attesting Officer

Commissioner of Patents and Trademarks